US009169345B2

(12) United States Patent
Morgan et al.

(10) Patent No.: US 9,169,345 B2
(45) Date of Patent: Oct. 27, 2015

(54) IN-MOLD COATED ARTICLES PREPARED IN ASSOCIATION WITH CATIONIC-STABILIZED DISPERSIONS AND METHODS FOR MANUFACTURING SAME

(75) Inventors: Paul Morgan, Evansville, IN (US); Brodie Wright, Evansville, IN (US)

(73) Assignee: Red Spot Paint & Varnish Co., Inc., Evansville, IN (US)

( * ) Notice: Subject to any disclaimer, the term of this patent is extended or adjusted under 35 U.S.C. 154(b) by 801 days.

(21) Appl. No.: 13/307,734

(22) Filed: Nov. 30, 2011

(65) Prior Publication Data

US 2012/0157612 A1 Jun. 21, 2012

Related U.S. Application Data

(60) Provisional application No. 61/418,140, filed on Nov. 30, 2010.

(51) Int. Cl.

| | |
|---|---|
| ***B32B 23/04*** | (2006.01) |
| ***C08G 18/62*** | (2006.01) |
| ***C09D 105/00*** | (2006.01) |
| ***B29C 37/00*** | (2006.01) |
| ***C09D 105/08*** | (2006.01) |
| ***B32B 5/14*** | (2006.01) |
| ***B32B 23/00*** | (2006.01) |
| ***B32B 33/00*** | (2006.01) |
| ***C08G 18/70*** | (2006.01) |
| ***C09D 175/04*** | (2006.01) |
| ***C09D 179/08*** | (2006.01) |

(52) U.S. Cl.

CPC ........ *C08G 18/6216* (2013.01); *B29C 37/0028* (2013.01); *B29C 37/0032* (2013.01); *B32B 5/14* (2013.01); *B32B 23/00* (2013.01); *B32B 23/04* (2013.01); *B32B 33/00* (2013.01); *C08G 18/706* (2013.01); *C09D 105/00* (2013.01); *C09D 105/08* (2013.01); *C09D 175/04* (2013.01); *C09D 179/08* (2013.01); *B29C 2037/0039* (2013.01); *B32B 2317/18* (2013.01); *Y10T 428/31971* (2015.04)

(58) Field of Classification Search

CPC ............ B29C 37/0028; B29C 37/0032; B29C 2037/0039; B32B 5/14; B32B 23/00; B32B 23/04; B32B 33/00; B32B 2317/18; C09D 105/00; C09D 105/08; Y10T 428/31971

USPC ................ 264/1.7, 240, 255, 331.11, 331.15, 264/331.19; 428/411.1, 423.1, 500, 532

See application file for complete search history.

(56) References Cited

U.S. PATENT DOCUMENTS 6,893,595 B1 * 5/2005 Muir et al. .................... 264/255

* cited by examiner

*Primary Examiner* — Patrick Niland
(74) *Attorney, Agent, or Firm* — King & Partners, PLC

(57) ABSTRACT

An in-mold coated article which is prepared in association with cationic-stabilized dispersions. Preferred cationic-stabilized dispersions, include cationic-stabilized polyurethane dispersions, cationic-stabilized acrylic dispersions, cationic-stabilized polyacrylamides, cationic-stabilized polyallylamines, cationic-stabilized polyetheramines, cationic-stabilized chitosans and/or combinations thereof.

The present invention further provides methods for manufacturing in-mold coated articles which are prepared in association with cationic-stabilized dispersions in a consistent and/or repeatable manner.

1 Claim, No Drawings

IN-MOLD COATED ARTICLES PREPARED IN ASSOCIATION WITH CATIONIC-STABILIZED DISPERSIONS AND METHODS FOR MANUFACTURING SAME

CROSS-REFERENCE TO RELATED APPLICATION(S)

This application claims the benefit of U.S. Provisional Application Ser. No. 61/418,140, filed Nov. 30, 2010, entitled "In-Mold Coated Articles Prepared In Association With Cationic-Stabilized Dispersions And Methods For Manufacturing Same," which is hereby incorporated herein by reference in its entirety, including all references cited therein.

BACKGROUND OF THE INVENTION

1. Field of the Invention

The present invention relates in general to in-mold coated articles for use in, for example, residential, commercial, industrial, and/or military products in any one of a number of industries, including, but not limited to, aerospace, automotive, construction, furniture, health care, and/or marine industries—just to name a few. More particularly, the present invention relates to in-mold coated articles which are prepared in association with cationic-stabilized dispersions, such as, for example, cationic-stabilized polyurethane dispersions, cationic-stabilized acrylic dispersions, cationic-stabilized polyacrylamides, cationic-stabilized polyallylamines, cationic-stabilized polyetheramines, cationic-stabilized chitosans and/or combinations thereof.

2. Background Art

In-mold coated articles and associated technology have been known in the art for several years. See, for example, U.S. Pat. No. 6,656,596 entitled "Decorative Automotive Interior Trim Articles with Cast Integral Light Stable Covering and Process for Making the Same," U.S. Pat. No. 5,906,788 entitled "Dual Cure, In-Mold Process for Manufacturing Abrasion Resistant, Coated Thermoplastic Articles," U.S. Pat. No. 5,662,996 entitled "Method for Manufacturing Self-Supporting Synthetic Trim Parts and Thus Manufactured Trim Parts," U.S. Pat. No. 5,418,032 entitled "Vehicle Interior Door Panel," U.S. Pat. No. 5,411,688 entitled "Method for Forming Plastic Molded Panels with Inserts," U.S. Pat. No. 5,242,738 entitled "Surface Layer of Interior Article," U.S. Pat. No. 4,902,578 entitled "Radiation-Curable Coating for Thermoplastic Substrates," U.S. Pat. No. 4,830,803 entitled "Method of Making a Molded Article of Methacrylic Resin," U.S. Pat. No. 3,248,467 entitled "Molding Process," U.S. Patent Application Publication No. 2003/0104168 A1 entitled "In-Mold-Coated Automotive Interior and Other Products, and Methods for Manufacturing Same," European Patent Application No. 1,079,962 B1 entitled "Decorative Automotive Interior Trim Articles with Integral In-Mold Coated Polyurethane Aromatic Elastomer Covering and Process for Making the Same," and International Publication No. WO 99/61216 entitled "Decorative Automotive Interior Trim Articles with Integral In-Mold Coated Polyurethane Aromatic Elastomer Covering and Process for Making the Same," all of which are hereby incorporated herein by reference in their entirety—including all references cited therein.

Furthermore, cationic stabilized dispersions are likewise known. See, for example, U.S. Pat. No. 6,339,125 entitled "Cationic Polyurethane Dispersion and Composition Containing Same," U.S. Pat. No. 6,017,998 entitled "Stable Aqueous Polyurethane Dispersions," U.S. Pat. No. 5,807,919 entitled "Water-Based Sulfonated Polymer Compositions," U.S. Pat. No. 5,723,518 entitled "Aqueous Two-Component Polyurethane Coating Compositions and a Method for Their Preparation," U.S. Pat. No. 5,700,867 entitled "Aqueous Dispersion of an Aqueous Hydrazine-Terminated Polyurethane," U.S. Pat. No. 5,696,291 entitled "Cationic Polyurethane Compositions, Quaternary Ammonium Salts and Methods for Their Preparation," U.S. Pat. No. 5,523,344 entitled "Water-Based Adhesive Formulation Having Enhanced Characteristics," U.S. Pat. No. 5,043,381 entitled "Aqueous Dispersions of a Nonionic, Water Dispersible Polyurethane Having Pendent Polyoxyethylene Chains," U.S. Patent Application Publication No. 2009/0105411 A1 entitled "Aqueous Non-Ionic Hydrophilic Polyurethane Dispersions, and a Continuous Process of Making the Same," and U.S. Patent Application Publication No. 2005/0182187 A1 entitled "Polyurethane Dispersions and Coatings Made Therefrom"—all of which are hereby incorporated herein by reference in their entirety—including all references cited therein.

While the utilization of in-mold coated articles has become increasingly popular in several industries, to the best of Applicant's knowledge, cationic stabilized dispersions and certain embodiments thereof, have not been used to provide robust in-mold coated articles. Indeed, historically the field of in-mold coatings for polyurethane substrates, and other substrates, has been dominated by waterborne coatings that are anionically (containing carboxyl functionality neutralized with an amine and stable at basic pH or non-ionically (pH-independent hydrophilic groups in the backbone) stabilized.

It is therefore an object of the present invention, among other objects, to provide novel and robust in-mold coated articles which are prepared in association with cationic-stabilized dispersions. It is also an object of the present invention to provide methods for manufacturing such novel in-mold articles in a repeatable manner.

These and other features, advantages, and objects of the present invention will be further understood and appreciated by those skilled in the art by reference to the following specification, claims, and appended drawings.

SUMMARY OF THE INVENTION

The present invention is directed to an in-mold coated article which is prepared in association with cationic-stabilized dispersions. In this embodiment, the cationic-stabilized dispersions preferably include cationic-stabilized polyurethane dispersions, cationic-stabilized acrylic dispersions, cationic-stabilized polyacrylamides, cationic-stabilized polyallylamines, cationic-stabilized polyetheramines, cationic-stabilized chitosans, and/or combinations thereof.

The present invention is also directed to a method for manufacturing an in-mold coated article, comprising the steps of: (a) optionally applying a mold release agent to at least a portion of a tool surface; (b) applying a cationic-stabilized dispersion to at least a portion of the tool surface and/or the mold release agent; and (c) associating a substrate with the tool surface having the optional mold release agent and the cationic-stabilized dispersion to, in turn, generate an in-mold coated article.

BRIEF DESCRIPTION OF THE DRAWINGS

Not Applicable.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

In accordance with the present invention, in-mold coated articles are disclosed herein which are prepared in association with cationic-stabilized dispersions. The articles are preferably fabricated from, for example, polyurethane (e.g., sprayskin, foam, RIM, slush TPU), vinyl (e.g., slush vinyl), thermoplastic polyolefin, elastomers, among others.

In further accordance with the present invention, the cationic-stabilized dispersions, preferably comprise cationic-stabilized polyurethane dispersions, cationic-stabilized acrylic dispersions (Ottopol KX-99), cationic-stabilized polyacrylamides, cationic-stabilized polyallylamines, cationic-stabilized polyetheramines and/or cationic-stabilized chitosans.

The novel coatings disclosed herein are characterized by the cationic nature of the waterborne resin(s) being used. Cationic resins are characterized by amine functionality on the backbone and, as such, are stable aqueous dispersions at generally basic pHs. The amine functionality on the backbone of these resins affords excellent adhesion to, for example, a polyurethane article which is placed in the mold following the coating application. Such improved adhesion provides the ability to process over a wide range of substrates at varying NCO/OH ratios. Further benefits are extremely fast dry times, near zero-VOC emission, as well as the ability to be crosslinked at the amine sites for improved properties.

Without being bound by any one particular theory, it is believed that when the coating is sprayed into the mold, the amine groups become available as an acid (typically glacial acetic acid or formic acid) evaporates. The amine groups interact in a plurality of ways with the substrate (e.g., polyurethane) which is subsequently applied to the mold. In the case of primary and secondary amine functionality, active hydrogens available on the coating backbone are believed to allow for a thermodynamically favored reaction site with the isocyanate portion of the polyurethane material placed in the mold after the coating. The controlled, yet rapid formation of covalent bonds due to amine-isocyanate reactions is believed to provide for enhanced adhesion and exemplary processing. In the case of tertiary amines and quaternary ammonium salts, the amines may associate themselves with the polyurethane applied to the mold in the form of accelerators for the isocyanate-polyol reaction of the polyurethane substrate.

Notwithstanding the foregoing and regardless of the precise mechanism, one unexpected advantage of the cationic nature of the coating is a more robust in-mold product which is capable of being applied over a wider range of polyurethane substrates utilizing varying NCO/OH ratios and catalyst packages. An additional advantage to the cationic system is the potential availability of free hydrogens via amine groups (once the acid evaporates after application) for reaction with crosslinkers, including epoxy-functional silanes, polyisocyanates, water-reducible epoxy prepolymers, etcetera. One benefit of the added crosslinker is to increase any particular desirable property (i.e., chemical resistance, abrasion resistance, water resistance, toughness, etcetera).

In one embodiment of the present invention, the process for fabricating the in-mold coated article comprises first applying a mold release agent to at least a portion of a tool surface. It will be understood that applying the mold release agent to the tool is optional. It will be further understood that any one of a number of conventional mold release agents are suitable for use with the present invention. Next, one or more of the cationic-stabilized dispersions disclosed herein is associated with at least a portion of the tool surface and/or the mold release agent. Finally, a substrate is associated with the tool surface having the optional mold release agent and the cationic-stabilized dispersion to, in turn, generate an in-mold coated article.

The invention is further described by the following examples.

Formulation Example 1

| | | |
|---|---|---|
| a. | Hydran CP-7050 | 93.31% |
| b. | Lanco Liquimatt 6035 | 5.73% |
| c. | Surfynol 104BC | 0.46% |
| d. | SN-Thickener 612 | 0.50% |

Formulation Example 2

| | PART A | |
|---|---|---|
| a. | Ottopol KX-99 | 81.63% |
| b. | Syloid 75X5500 | 2.49% |
| c. | Michem Glide 37 | 2.49% |
| d. | Deionized Water | 12.24% |
| e. | Byk 024 | 0.49% |
| f. | Surfynol 104BC | 0.49% |
| g. | SN-Thickener 612 | 0.25% |
| | PART B | |
| a. | Bayhydur LS2306 | 70% |
| b. | Butyl Acetate | 30% |
| Part A is mixed with Part B at a ratio of approximately 8:1. | | |
| | Part C | |
| a. | Dow Corning Z-6040 | 100% |
| Part A is mixed with Part C at a ratio of approximately 6:1. | | |

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed and desired to be secured by Letters Patent of the United States is:

1. An in-mold coated article, comprising:

an inner surface and an outer surface, characterized in that the in-mold coated article is prepared in association with a cationic-stabilized dispersion, wherein the cationic-stabilized dispersion comprises a cationic-stabilized chitosan.

* * * * *